US010983298B2

(12) United States Patent
Kim

(10) Patent No.: US 10,983,298 B2
(45) Date of Patent: *Apr. 20, 2021

(54) LENS DRIVING APPARATUS

(71) Applicant: LG INNOTEK CO., LTD., Seoul (KR)

(72) Inventor: Ji Hoon Kim, Gunpo-si (KR)

(73) Assignee: LG INNOTEK CO., LTD., Seoul (KR)

( * ) Notice: Subject to any disclaimer, the term of this patent is extended or adjusted under 35 U.S.C. 154(b) by 71 days.

This patent is subject to a terminal disclaimer.

(21) Appl. No.: 15/910,614

(22) Filed: Mar. 2, 2018

(65) Prior Publication Data

US 2018/0188471 A1     Jul. 5, 2018

Related U.S. Application Data

(63) Continuation of application No. 13/873,978, filed on Apr. 30, 2013, now Pat. No. 9,939,606, which is a (Continued)

(30) Foreign Application Priority Data

Nov. 23, 2006 (KR) .................. 10-2006-0116317

(51) Int. Cl.
*G02B 7/02* (2021.01)
*G03B 3/10* (2021.01)
(Continued)

(52) U.S. Cl.
CPC .............. *G02B 7/023* (2013.01); *G02B 7/08* (2013.01); *G02B 27/0006* (2013.01); *G03B 3/10* (2013.01);
(Continued)

(58) Field of Classification Search
CPC ...... G02B 7/023; G02B 7/08; G02B 27/0006; H02K 41/0356; G11B 7/0935; G11B 7/0933; G03B 3/10
See application file for complete search history.

(56) References Cited

U.S. PATENT DOCUMENTS 5,177,640 A   1/1993 Grassens
6,856,469 B2  2/2005 Yoneyama et al.
(Continued)

FOREIGN PATENT DOCUMENTS

CN   1763623 A   4/2006
CN   1831576 A   9/2006
(Continued)

OTHER PUBLICATIONS

European Search Report dated Dec. 16, 2014 in European Application No. 14183960.5.
(Continued)

*Primary Examiner* — Alicia M Harrington
(74) *Attorney, Agent, or Firm* — Saliwanchik, Lloyd & Eisenschenk

(57) ABSTRACT

Disclosed is a lens driving apparatus. The lens driving apparatus includes a base, a yoke coupled to the base, having an upper surface formed with a hole, a closed side surface, and an opened bottom surface, a bobbin movably installed in an inner portion of the yoke, a lens module coupled to the bobbin to go in and out the hole according to movement of the bobbin, a magnet fixed to an inner portion of the yoke, a coil fixed to an outer portion of the bobbin while facing the magnets, and springs coupled to the bobbin to provide restoration force to the bobbin.

36 Claims, 2 Drawing Sheets

Related U.S. Application Data continuation of application No. 12/910,293, filed on Oct. 22, 2010, now Pat. No. 8,451,553, which is a continuation of application No. 12/516,146, filed as application No. PCT/KR2007/005901 on Nov. 22, 2007, now Pat. No. 7,885,023.

(51) Int. Cl.
  *G11B 7/09* (2006.01)
  *H02K 41/035* (2006.01)
  *G02B 7/08* (2021.01)
  *G02B 27/00* (2006.01)

(52) U.S. Cl.
  CPC .......... *G11B 7/0933* (2013.01); *G11B 7/0935* (2013.01); *H02K 41/0356* (2013.01)

(56) References Cited

U.S. PATENT DOCUMENTS

| | | | |
|---|---|---|---|
| 7,298,562 | B2 | 11/2007 | Sue et al. |
| 7,394,603 | B2 | 7/2008 | Shiraki et al. |
| 7,400,068 | B2 | 7/2008 | Tseng |
| 7,649,703 | B2 | 1/2010 | Shiraki et al. |
| 7,916,412 | B2 | 3/2011 | Li et al. |
| 8,451,553 | B2 | 5/2013 | Kim |
| 9,939,606 | B2 * | 4/2018 | Kim .................. G02B 7/023 |
| 2002/0054547 | A1 | 5/2002 | Fujinoki et al. |
| 2006/0028320 | A1 | 2/2006 | Osaka |
| 2006/0034599 | A1 | 2/2006 | Osaka |
| 2006/0181632 | A1 | 8/2006 | Makii et al. |
| 2006/0203627 | A1 | 9/2006 | Osaka |
| 2007/0091199 | A1 | 4/2007 | Shiraki et al. |
| 2007/0110424 | A1 | 5/2007 | Iijima et al. |
| 2007/0133110 | A1 | 6/2007 | Huang |
| 2008/0055752 | A1 | 3/2008 | Ishizawa et al. |
| 2008/0117536 | A1 | 5/2008 | Higuchi |

FOREIGN PATENT DOCUMENTS

| | | | |
|---|---|---|---|
| DE | 20-2006-009115 U1 | | 8/2006 |
| EP | 1698925 A1 | | 9/2006 |
| EP | 1970741 A1 | | 9/2008 |
| JP | 2002-352449 A | | 12/2002 |
| JP | 2003-005014 A | | 1/2003 |
| JP | 2003-149537 A | | 5/2003 |
| JP | 2005-173431 A | | 6/2005 |
| JP | 2005-234404 A | | 9/2005 |
| JP | 2006-047342 A | | 2/2006 |
| JP | 2006-074990 | | 3/2006 |
| JP | 2006-259032 A | | 9/2006 |
| KR | 10-1999-0009117 A | | 2/1999 |
| KR | 20-0370323 | | 12/2004 |
| KR | 10-2005-0029700 A | | 3/2005 |
| KR | 10-2005-0082413 A | | 8/2005 |
| KR | 10-2005-0093111 A | | 9/2005 |
| KR | 10-0548869 B1 | | 1/2006 |
| KR | 10-2006-0023760 A | | 3/2006 |
| KR | 10-2006-0084130 A | | 7/2006 |
| KR | 10-2008-0046819 A | | 5/2008 |
| TW | 200525859 A | | 8/2005 |
| TW | M285846 U | | 1/2006 |
| TW | M290574 U | | 5/2006 |
| TW | 265668 B | | 11/2006 |

OTHER PUBLICATIONS

First Office Action dated Mar. 21, 2012 in Chinese Application No. 201110151745.4, filed Nov. 22, 2007.
Office Action dated Apr. 18, 2014 in Korean Application No. 10-2013-0045730.
Office Action dated Apr. 20, 2012 in Korean Application No. 10-2010-0131070, filed Dec. 20, 2010.
Office Action dated Apr. 23, 2012 in Korean Application No. 10-2006-0116317, filed Nov. 23, 2006.
Office Action dated Dec. 29, 2014 in Korean Application No. 10-2014-0105248.
Office Action dated Jan. 26, 2017 in U.S. Appl. No. 14/437,771.
Office Action dated May 4, 2016 in Korean Application No. 10-2016-0023684.
Office Action dated Nov. 5, 2015 in Taiwan Application No. 103130234.
Office Action dated Oct. 8, 2012 in Korean Application No. 10-2010-0131070, filed Dec. 20, 2010.
Office Action dated Sep. 6, 2017 in Taiwanese Application No. 105136133, along with its English Translation.
Supplementary European Search Report dated Apr. 2, 2012 in European Application No. 07834206.0, filed Nov. 22, 2007.
European Search Report dated Jun. 29, 2018 in European Application No. 18162370.3.

* cited by examiner

[Fig. 1]
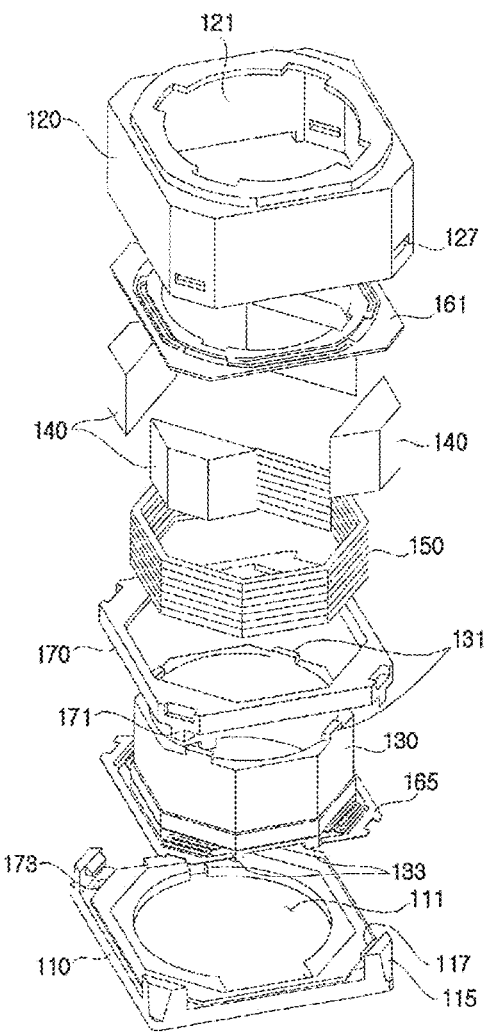
[Fig. 2]
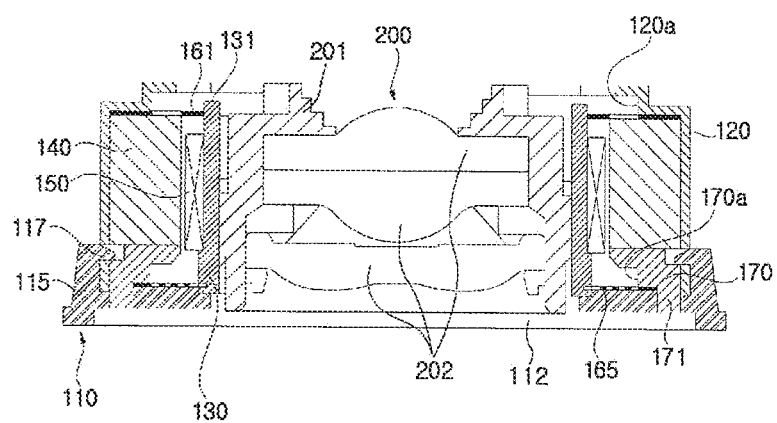

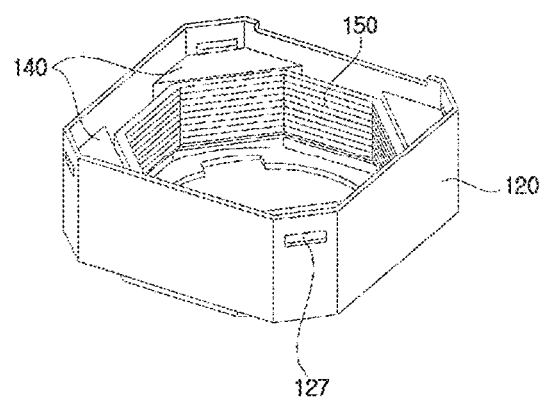
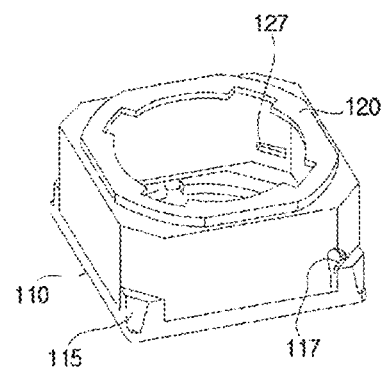

LENS DRIVING APPARATUS

CROSS-REFERENCE TO RELATED APPLICATIONS

This application is a continuation of U.S. application Ser. No. 13/873,978, filed Apr. 30, 2013, now U.S. Pat. No. 9,939,606, issued Apr. 10, 2018; which is a continuation of U.S. application Ser. No. 12/910,293, filed Oct. 22, 2010, now U.S. Pat. No. 8,451,553, issued May 28, 2013; which is a continuation of U.S. application Ser. No. 12/516,146, filed May 22, 2009, now U.S. Pat. No. 7,885,023, issued Feb. 8, 2011; which is the U.S. national stage application of International Patent Application No. PCT/KR2007/005901, filed Nov. 22, 2007; which claims priority to Korean Patent Application No. 10-2006-0116317, filed Nov. 23, 2006, all of which are incorporated herein by reference in their entirety.

TECHNICAL FIELD

The present invention relates to a lens driving apparatus.

BACKGROUND ART

Recently, as electronic appliances have multi-functions, various electronic appliances having cameras therein, such as MP3 players, mobile communication terminals and PDAs, have been widely used.

As electronic appliances having cameras therein are manufactured in a small size, parts for providing camera functions must also be manufactured in a small size.

Further, since electronic appliances having cameras therein may be easily exposed to external environment or impact in terms of the characteristics of portable electronic appliances, external impurities may easily penetrate into the electronic appliances or the electronic appliances may be easily broken by the impact.

Technical Problem

The embodiment provides a lens driving apparatus which can be designed in a simple structure and manufactured in a small size. The embodiment provides a lens driving apparatus having high resistance against impact and inhibiting penetration of external impurities.

Technical Solution

A lens driving apparatus according to an embodiment comprising: a base; a yoke coupled to the base, having an upper surface formed with a hole, a closed side surface, and an opened bottom surface; a bobbin movably installed in an inner portion of the yoke; a lens module coupled to the bobbin to go in and out the hole according to movement of the bobbin; a magnet fixed to an inner portion of the yoke; a coil fixed to an outer portion of the bobbin while facing the magnets; and springs coupled to the bobbin to provide restoration force to the bobbin.

Advantageous Effects

According to the lens driving apparatus of the embodiment, a yoke is directly coupled to a base and parts are installed in a space formed in an inner portion of the base and the yoke. Accordingly, since an additional case is not necessary, the number of parts is reduced, an assembly procedure is simplified, and thus the manufacturing cost can be saved. Further, according to the lens driving apparatus of the embodiment, the base is coupled to the yoke while maintaining a sealing status by locking holes of the base and locking protrusions of the yoke. That is, any gap does not exist in the sides of the base and the yoke, a hole of the yoke is shielded by a lens module, and a through hole of the base is closely coupled to an electronic appliance, so that impurities can be inhibited from penetrating into the inner space formed be the base and the yoke. As a result, the parts are not damaged by the impurities. Furthermore, when a prism magnet is used, since the manufacturing cost is saved as compared with a case of using a ring-shaped magnet, the economical efficiency can be improved.

BRIEF DESCRIPTION OF THE DRAWINGS

FIG. 1 is an exploded perspective view showing a lens driving apparatus according to the embodiment;

FIG. 2 is a sectional view showing the lens driving apparatus in FIG. 1;

FIG. 3 is a perspective view showing a state in which a magnet and a coil are installed at the yoke in FIG. 1; and FIG. 4 is a perspective view showing a coupling state of the yoke and the base in FIG. 1.

MODE FOR THE INVENTION

Hereinafter, a lens driving apparatus according to an embodiment will be described with reference to accompanying drawings. FIG. 1 is an exploded perspective view showing the lens driving apparatus according to the embodiment, FIG. 2 is a sectional view showing the lens driving apparatus in FIG. 1, and FIG. 3 is a perspective view showing a state in which a magnet and a coil are installed at the yoke in FIG. 1.

As shown in FIGS. 1 and 2, the lens driving apparatus according to the embodiment comprises a base 110 and a metal yoke 120 which are coupled to each other to form a predetermined space.

The base 110 has a disc shape or a polygonal plate shape and is formed at the central portion thereof with a through hole 111. The bottom surface of the base 110 is coupled to an electronic appliance (not shown) and a circuit substrate 112 provided with an image sensor (not shown) is arranged in the through hole 111.

The yoke 120 is coupled to the base 110 to serve as a case for protecting parts. The yoke 120 has an upper surface, at which a hole 121 allowing entrance of a lens module 200 is formed, an opened bottom surface making contact with the upper surface of the base 110, and closed lateral side surfaces.

The side surfaces of the lens driving apparatus according to the embodiment are closed by the base 110 and the yoke 120. Accordingly, since an additional case for protecting the lens driving apparatus is not necessary, the structure of the lens driving apparatus can be simplified. Further, since the side surfaces of the lens driving apparatus are closed, external impurities cannot penetrate into the inner side of the lens driving apparatus.

A ring-shaped bobbin 130 that goes in and out the hole 121 is movably installed at the inner side of the yoke 120. The lens module 200 provided with a lens 202 and a support 201 for supporting the lens 202 is coupled to the inner peripheral surface of the bobbin 130.

The bobbin 130 includes an outer surface having a circular or a polygonal shape corresponding to the yoke 120, and an inner surface having a circular shape corresponding to the outer surface of the lens module 200. According to the embodiment, the bobbin 130 includes an outer surface having an octagonal shape.

Magnets 140 are fixed to the inner peripheral surface of the yoke 120, and a coil 150 is wound around the outer peripheral surface of the bobbin 130 while facing the magnets 140.

The magnet 140 has a circular or a polygonal shape corresponding to the yoke 120. As shown in FIGS. 1 and 3, when the yoke 120 is a polygonal case, a plurality of prism magnets 140 are prepared and three sides of each magnet 140 make contact with the inner peripheral surface of the yoke 120.

In the lens driving apparatus according to the embodiment, since the magnets 140 are installed at four edges of the yoke 120, respectively, an empty space between the yoke 120 and the coil 150 can be effectively utilized. Accordingly, the lens driving apparatus can be manufactured in a smaller size. Further, since the prism magnet 140 is inexpensive as compared with a ring-shaped magnet, the lens driving apparatus with a low price can be manufactured.

Since the coil 150 is wound around the outer peripheral surface of the bobbin 130, the coil 150 has a circular or a polygonal shape corresponding to the outer surface of the bobbin 130. If the coil 150 has a polygonal shape and the magnet 140 has a circular shape, the distance between the coil 150 and the magnet 140 becomes non-uniform.

Accordingly, when the coil 150 has a polygonal shape, the magnet 140 has a prism shape as shown in FIGS. 1 and 3.

As electric current is applied to the coil 150, the coil 150 moves upward according to the interaction of the electric field generated by the coil 150 and the magnetic field generated by the magnet 140, and thus the bobbin 130 moves upward. Accordingly, the lens module 200 coupled to the bobbin 130 also moves upward.

In addition, if the electric current is not applied to the coil 150, the bobbin 130 moves downward. To this end, upper and lower leaf springs 161 and 165 having a coil structure are installed at the upper and lower portions of the bobbin 130 in order to provide restoration force for returning the bobbin 130 to the initial state.

At this time, the outer portion of the upper spring 161 is inserted between the yoke 120 and the upper surface of the magnet 140. Further, the inner portion of the upper spring 161 is inserted into first support protrusions 131 formed on the upper end surface of the bobbin 130. Accordingly, the upper spring 161 can be inhibited from being rotated and moved due to external impact.

The inner portion of the lower spring 165 is integrally formed with the bobbin 130 through injection molding, and the outer portion of the lower spring 165 is inserted between the bottom surface of a spacer 170 and the base 110. Further, second support protrusions 133 that make contact with the inner peripheral surface of the through hole 110 formed in the base 110 are formed on the lower end surface of the bobbin 130. The second support protrusions 133 guide and support the bobbin 130 such that the bobbin 130 can be coupled to another element at an exact position and exactly move upward and downward.

The spacer 170 is installed at the base 110 below the magnets 140 and the outer surface of the lower spring 165 is inserted between the lower surface of the spacer 170 and the base 110. That is, the outer portion of the lower spring 165 is supported between the spacer 170 and the base 110, and the inner portion of the lower spring 165 is integrally formed with the bobbin 130, so that the lower spring 165 can be inhibited from being rotated and moved due to external impact.

Further, the spacer 170 has insertion protrusions 171 used for firm coupling and movement prevention of the spacer 170, and the base 110 has support holes 173 into which the insertion protrusions 171 are inserted.

The yoke 120 and the spacer 170 have step sections 120a and 170a, respectively, as shown in FIG. 2. the step sections 120a and 170a provide a space for movement of the middle parts of the upper and lower leaf springs 161 and 165.

Hereinafter, a coupling structure of the base 110 and the yoke 120 will be described with reference to FIGS. 1, 2 and 4.

FIG. 4 is a perspective view showing a coupling state of the yoke and the base in FIG. 1.

As shown in FIG. 4, the base 110 has a plurality of protrusion plates 115 protruding upward on the outer surface thereof, and locking protrusions 117 are formed at the protrusion plates 115, respectively. Further, the yoke 120 has locking holes 127 at the sides thereof, into which the locking protrusions 117 are inserted.

The base 110 is closely coupled to the yoke 120 by using the locking protrusions 117 and the locking holes 127.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The lens driving apparatus according to the embodiment can be manufactured in a small size, can inhibit external impurities from penetrating into the inner portion of the lens driving apparatus, and is not broken due to external impact.

Further, the lens driving apparatus according to the embodiment can be applied to both cameras and various electronic appliances provided with the cameras.

What is claimed is:
1. A lens driving apparatus comprising:
a base comprising an opening and a recess provided at an inner lateral surface of the opening;
a yoke disposed on the base, the yoke comprising an upper plate and a side plate;
a bobbin disposed in the yoke, wherein the bobbin comprises a first support protrusion provided on an upper surface of the bobbin and a second support protrusion provided on a lower surface of the bobbin;
magnets coupled to the yoke;
a coil wound around an outer peripheral surface of the bobbin while facing the magnets;
an upper spring disposed on the upper surface of the bobbin; and
a lower spring disposed on the lower surface of the bobbin,
wherein the second support protrusion of the bobbin is inserted into the recess of the opening of the base.
2. The lens driving apparatus of claim 1, wherein the bobbin is configured to move in a vertical direction, and
wherein a side surface of the second support protrusion of the bobbin faces an inner surface of the recess of the opening of the base in a horizontal direction perpendicular to the vertical direction.

3. The lens driving apparatus of claim 2, wherein the second support protrusion of the bobbin is configured to contact the inner surface of the recess of the opening of the base.

4. The lens driving apparatus of claim 2, wherein the inner surface of the recess of the opening of the base comprises three planes facing side surfaces of the second support protrusion, respectively.

5. The lens driving apparatus of claim 1, wherein the second support protrusion of the bobbin comprises a plurality of second support protrusions.

6. The lens driving apparatus of claim 1, wherein, when viewed from a bottom surface of the base, the recess of the opening of the base comprises a polygonal shape.

7. The lens driving apparatus of claim 1, wherein the recess of the opening of the base comprises a shape corresponding to a shape of the second support protrusion.

8. The lens driving apparatus of claim 1, wherein the bobbin is configured to move in a vertical direction along an optical axis,
wherein the upper spring comprises an inner side coupled to the first support protrusion of the bobbin, an outer side overlapped with the upper plate of the yoke in the vertical direction, and an intermediate portion connecting the inner side and the outer side, and
wherein at least a portion of the intermediate portion is overlapped with the upper plate of the yoke in the vertical direction.

9. A camera comprising:
the lens driving apparatus of claim 1; and
a lens coupled to the bobbin of the lens driving apparatus.

10. An electronic appliance comprising the camera according to claim 9.

11. A lens driving apparatus comprising:
a base;
a yoke disposed on the base, the yoke comprising an upper plate and a side plate extending from the upper plate;
a bobbin disposed in the yoke, comprising a stepped region on an outer peripheral surface thereof, and configured to move in a first direction along an optical axis;
magnets coupled to an inner surface of the yoke;
a coil disposed on the stepped region of the bobbin and facing the magnets;
an upper spring disposed in the yoke and coupled to an upper portion of the bobbin; and
a lower spring coupled to a lower portion of the bobbin,
wherein the coil is wound in a polygonal shape,
wherein a portion of the coil faces the lower spring in the first direction,
wherein the upper spring is disposed between the upper plate of the yoke and the magnets,
wherein the upper plate of the yoke comprises a first portion, a second portion disposed on the first portion, and a step portion connecting the first portion and the second portion, the second portion being higher than the first portion,
wherein the side plate of the yoke extends downwards from the first portion of the upper plate of the yoke,
wherein the upper spring comprises an inner side coupled to the upper portion of the bobbin, an outer side disposed between the upper plate of the yoke and the magnets, and an intermediate portion connecting the inner side and the outer side,
wherein at least a portion of the intermediate portion is overlapped with the second portion of the upper plate of the yoke in the first direction, and
wherein the second portion of the yoke is not overlapped with a portion of the yoke under the step portion in the first direction.

12. The lens driving apparatus of claim 11, wherein the upper plate of the yoke, the outer side of the upper spring, and an upper surface of the magnets are overlapped with each other in the first direction.

13. The lens driving apparatus of claim 11, wherein the intermediate portion of the upper spring is spaced apart downwards from a lower surface of the second portion of the upper plate of the yoke.

14. The lens driving apparatus of claim 11, wherein, a shortest distance from the outer side of the upper spring to the first portion of the upper plate of the yoke is smaller than a shortest distance from the intermediate portion of the upper spring to the second portion of the upper plate of the yoke.

15. The lens driving apparatus of claim 11, wherein the intermediate portion of the upper spring is configured to move to a position higher than the outer side of the upper spring while below the second portion of the upper plate of the yoke.

16. The lens driving apparatus of claim 11, wherein an inner surface of the side plate of the yoke is coupled to a side surface of the magnets.

17. The lens driving apparatus of claim 11, wherein the yoke is formed of metal.

18. The lens driving apparatus of claim 11, wherein the base comprises locking protrusions and the yoke comprises locking holes to which the locking protrusions are coupled.

19. The lens driving apparatus of claim 11, wherein the magnets are disposed at corners of the yoke, respectively,
wherein each of the magnets has a prism shape, and
wherein the coil has a polygonal shape.

20. The lens driving apparatus of claim 11, wherein the side plate of the yoke provides a closed line surrounding the coil and the magnets in a cross-sectional plane of the lens driving apparatus perpendicular to the first direction.

21. The lens driving apparatus of claim 11, wherein a shape of the outer peripheral surface of the bobbin comprises an octagonal shape corresponding to a shape of the coil.

22. The lens driving apparatus of claim 11, wherein the magnets include four magnets,
wherein each of the magnets has an upper surface, a lower surface, and four side surfaces,
wherein the coil is wound in an octagonal shape including eight side surfaces, and
wherein four side surfaces of the eight side surfaces of the coil face the four magnets, respectively.

23. The lens driving apparatus of claim 22, wherein the four side surfaces of each magnet comprise a first flat surface facing the coil and three flat surfaces not facing the coil.

24. The lens driving apparatus of claim 11, wherein the yoke includes a metal material, and
wherein a part of the intermediate portion of the upper spring is configured to move to a height corresponding to the step portion of the upper plate of the yoke.

25. The lens driving apparatus of claim 11, wherein the coil, the magnets, the bobbin, the upper spring, and the lower spring are disposed in an inner space provided by the base and the yoke.

26. The lens driving apparatus of claim 11, wherein the outer side of the upper spring is coupled to an upper surface of the magnets.

27. The lens driving apparatus of claim 11, wherein the bobbin is not disposed between the portion of the coil and the lower spring.

28. The lens driving apparatus of claim 11, wherein nothing is disposed between the portion of the coil and the lower spring.

29. The lens driving apparatus of claim 11, wherein the yoke is not disposed between the portion of the coil and the lower spring.

30. The lens driving apparatus of claim 11, wherein in a cross-sectional plane of the lens driving apparatus that is parallel to the first direction and connecting two corners of the base diagonal to each other, a shortest distance between the bobbin and the step portion of the yoke is smaller than a shortest distance between the yoke and a side surface of the bobbin in a region where the bobbin and the coil meet.

31. The lens driving apparatus of claim 11, wherein an inner diameter of the yoke formed in the second portion of the yoke is a smallest diameter among inner diameters of the yoke.

32. A lens driving apparatus comprising:
a base comprising an opening and a recess provided at an inner lateral surface of the opening;
a yoke disposed on the base;
a bobbin disposed in the yoke, wherein the bobbin comprises a support protrusion provided on a lower surface of the bobbin;
magnets coupled to the yoke;
a coil wound around an outer peripheral surface of the bobbin while facing the magnets;
an upper spring disposed on an upper surface of the bobbin; and
a lower spring disposed on the lower surface of the bobbin,
wherein the upper spring comprise an inner side coupled to the bobbin, an outer side coupled to the yoke, and an intermediate portion connecting the inner side and the outer side,
wherein the yoke comprises step section to provide a space for movement of the intermediate portion of the upper spring, and
wherein the support protrusion of the bobbin is inserted into the recess of the opening of the base.

33. A lens driving apparatus comprising,
a base;
a yoke disposed on the base, the yoke comprising an upper plate and a side plate extending from the upper plate;
a bobbin disposed in the yoke, comprising a stepped region on an outer peripheral surface, and configured to move in a first direction along an optical axis;
magnets coupled to an inner surface of the yoke;
a coil disposed on the stepped region of the bobbin and facing the magnets;
an upper spring disposed in the yoke and coupled to an upper portion of the bobbin; and
a lower spring coupled to a lower portion of the bobbin,
wherein the coil is wound in a polygonal shape,
wherein an air gap is formed between a portion of the coil and the lower spring in the first direction,
wherein the upper spring is disposed between the upper plate of the yoke and the magnets,
wherein the upper plate of the yoke comprises a first portion, a second portion disposed on the first portion, and a step portion connecting the first portion and the second portion, the second portion being higher than the first portion,
wherein the side plate of the yoke extends downwards from the first portion of the upper plate of the yoke,
wherein the upper spring comprises an inner side coupled to the upper portion of the bobbin, an outer side disposed between the upper plate of the yoke and the magnets, and an intermediate portion connecting the inner side and the outer side, and
wherein at least a portion of the intermediate portion of the upper spring is overlapped with the second portion of the upper plate of the yoke in the first direction.

34. The lens driving apparatus of claim 33, wherein in a cross-sectional plane of the lens driving apparatus that is connecting two corners of the base diagonal to each other, a shortest distance between the bobbin and the step portion of the yoke is smaller than a shortest distance between the yoke and a side surface of the bobbin in a region where the bobbin and the coil meet.

35. The lens driving apparatus of claim 33, wherein the step portion of the yoke is farther from the side plate of the yoke than is any portion of the upper plate except for the second portion of the yoke.

36. The lens driving apparatus of claim 33, wherein an inner diameter of the yoke formed in the second portion of the yoke is a smallest diameter among inner diameters of the yoke.

* * * * *